United States Patent [19]
Takahashi

[11] Patent Number: 5,245,376
[45] Date of Patent: * Sep. 14, 1993

[54] PHOTOGRAPHIC FILM CASSETTE

[75] Inventor: Koichi Takahashi, Kanagawa, Japan

[73] Assignee: Fuji Photo Film Co., Ltd., Kanagawa, Japan

[*] Notice: The portion of the term of this patent subsequent to Sep. 21, 2010 has been disclaimed.

[21] Appl. No.: 886,106

[22] Filed: May 21, 1992

Related U.S. Application Data

[63] Continuation of Ser. No. 656,273, Feb. 15, 1991, abandoned.

[30] Foreign Application Priority Data

Feb. 15, 1990 [JP] Japan .................................... 2-34624
Apr. 13, 1990 [JP] Japan .................................... 2-98173

[51] Int. Cl.$^5$ .............................................. G03B 17/26
[52] U.S. Cl. .................................... 354/275; 242/71.1
[58] Field of Search ...................... 354/275; 242/71.1

[56] References Cited

U.S. PATENT DOCUMENTS

| | | | |
|---|---|---|---|
| 2,336,278 | 12/1943 | Mihalyi | 354/212 |
| 2,360,255 | 10/1944 | Mihalyi | 242/71 |
| 2,364,381 | 12/1944 | Mihalyi | 354/212 |
| 2,521,935 | 9/1950 | Monroe . | |
| 2,537,883 | 1/1951 | Ernisse | 95/31 |
| 2,552,200 | 5/1951 | Mihalyi | 242/71 |
| 3,467,340 | 9/1969 | Rosenburgh | 242/197 |
| 3,556,435 | 1/1971 | Wangerin | 242/210 |
| 3,627,229 | 12/1971 | Wangerin | 242/210 |
| 3,627,230 | 12/1971 | Wangerin | 242/210 |
| 3,677,499 | 7/1972 | Wangerin | 242/210 |
| 3,797,777 | 3/1974 | Hosono et al. | 242/197 |
| 4,214,828 | 7/1980 | Axelrod | 354/275 |
| 4,650,304 | 3/1987 | Harvey | 354/21 |
| 4,834,306 | 5/1989 | Robertson et al. | 242/71.1 |
| 4,841,319 | 6/1989 | Hansen | 354/275 |
| 4,846,418 | 7/1989 | Fairman | 242/71.1 |
| 4,962,401 | 10/1990 | Takahashi | 354/275 |
| 5,003,334 | 3/1991 | Pagano et al. | 354/275 |

FOREIGN PATENT DOCUMENTS

| | | |
|---|---|---|
| 2734321 | 2/1979 | Fed. Rep. of Germany . |
| 2921379 | 11/1980 | Fed. Rep. of Germany . |
| 2048752 | 3/1971 | France . |
| 4975340 | 10/1962 | Japan . |
| 63-184750 | 7/1988 | Japan . |
| 1343615 | 1/1974 | United Kingdom . |

Primary Examiner—David M. Gray
Attorney, Agent, or Firm—Sughrue, Mion, Zinn, Macpeak & Seas

[57] ABSTRACT

A photographic film cassette has a spool, rotation of which causes a film leader to advance outside of a cassette shell. In a receiving recess formed on a spool end for receiving a rewinding shaft of a camera, a pentagonal circumference is formed for receiving a driving force from the rewinding shaft. Inclined planes are formed on the inside of the receiving recess for guiding insertion of the rewinding shaft into the receiving recess. Because the spool is rotated in axial coincidence with the rewinding shaft, the film can be advanced reliably outside of the cassette by slipping the outermost turn of the wound film smoothly with reference to a self-advancing mechanism. In a preferred embodiment, a film cassette is constituted by two shell halves, with one of which a part of the film passage mouth is integrated. A positioning member is integrated with the same shell half for positioning the cassette shell in contact with a receiving member formed in a film loading chamber. The film passage mouth thus can be connected precisely to the film passageway in the camera.

7 Claims, 13 Drawing Sheets

PHOTOGRAPHIC FILM CASSETTE

This is a continuation of application Ser. No. 07/656,273 filed Feb. 15, 1991, now abandoned.

BACKGROUND OF THE INVENTION

The present invention relates to a photographic film cassette, and more particularly to an improved self-advancing film cassette capable of initially advancing the film smoothly by rotating the spool.

In a camera for use with 135 film, unexposed photographic film is drawn from a film cassette for each exposure, positioned on an exposure aperture, and wound up in a film take-up chamber. When no further wind-up can be carried out, a rewinding shaft provided in a film loading chamber of the camera rotates the spool to rewind the film in the cassette shell. For this purpose, a recess is formed on an end of the spool for fitting the spool end on a fork formed on the rewinding shaft. A pair of projections are formed inside the recess for rotating the spool in contact with the fork. In a conventional film cassette with a roll of 135 mm film contained therein, a leader of the film protrudes from the cassette shell. When the film cassette is loaded in the camera, the cassette shell is inserted in the film loading chamber while the film leader is treated carefully to be positioned appropriately along a film passageway in the camera.

Film cassettes for simplifying the loading operation have been proposed recently, as disclosed in U.S. Pat. Nos. 4,846,418 and 4,834,306. In such film cassettes, the film leader is contained completely in the cassette shell, and can be advanced outside the cassette shell by rotating the spool. According to U.S. Pat. No. 4,846,418, annular ridges are formed on the inside of the cassette shell to contact the outermost turn of the wound film so as to prevent the film from loosening around the spool.

In such a film cassette, which requires no treatment of the film leader while loading the cassette in the camera, there is a necessary construction to connect the film passage mouth appropriately to a film passageway along the exposure aperture. Thus, the cassette shell must be positioned precisely in the film loading chamber. It is known already from Japanese Utility Model Laid-Open Publication No. 49-75340 and Japanese Patent Laid-Open Publication No. 63-184750 to position the cassette shell correctly in the film loading chamber by forming a positioning portion on the cassette shell to contact a receiving member formed on the inside of the film loading chamber.

However, there is a problem with a self-advancing film cassette in which the outermost turn of the film is in contact with the annular ridges. If the spool is deviated axially from the rewinding shaft of the camera, the rotation of the spool causes the annular ridges to press excessively or scratch a part of the outermost turn of the film. The film leader might not be advanced because the sliding friction is greater.

According to known constructions for positioning the film cassette in the film loading chamber, there also is the problem of low precision. Errors in assembly cause deviation in connecting the film passage mouth to the film passageway, because the positioning portion is formed on a shell component different from that having a film passage mouth according to the disclosed construction.

SUMMARY OF THE INVENTION

Therefore, it is an object of the present invention to provide a photographic film cassette capable of advancing a leader of film smoothly and reliably outside the cassette shell.

It is another object of the present invention to provide a photographic film cassette capable of causing a film passageway of a camera reliably to receive the film leader advanced from the cassette shell.

In order to achieve the above and other objects and advantages of this invention, a film cassette is constituted by: a receiving recess formed on an end of the spool for receiving an end of a rewinding shaft provided with a camera for rotating the spool by being coupled with the spool end; coupling means, formed in the receiving recess, for receiving a driving force from the rewinding shaft; and an inclined surface, formed on the coupling means, for guiding an insertion of the rewinding shaft into the receiving recess.

According to a preferred embodiment, a film cassette further is constituted by: a molded first shell component as part of a cassette shell, with which at least a part of the film passage mouth is integrated; a second shell component joined to the first shell component to complete the cassette shell; and positioning structure, integrated with the first shell component, for positioning the cassette shell in contact with receiving structure formed in a film loading chamber in a camera.

Because the spool is rotated coaxially with the rewinding shaft in accordance with the present invention, the film can be advanced reliably to the outside by slipping the outermost turn of the wound film smoothly in contact with the annular ridges. Precision in position is improved between the film passage mouth and the positioning structure even in assembly. Accordingly, the contact of the positioning structure with the receiving structure in the film loading chamber makes it possible to position the cassette shell precisely in the film loading chamber.

BRIEF DESCRIPTION OF THE DRAWINGS

The above object and advantages of the present invention will become more apparent from the following detailed description when read in connection with the accompanying drawings, in which.

DETAILED DESCRIPTION OF THE PREFERRED EMBODIMENTS

Figure 1:
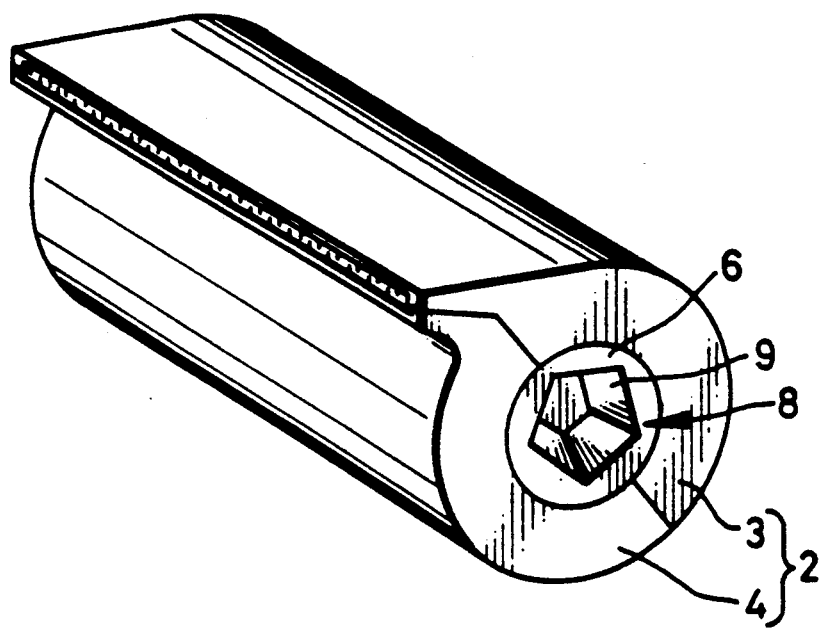
FIG. 1 is a perspective view of a film cassette according to a first embodiment of the present invention.

In FIG. 1, showing a first preferred embodiment of the inventive photographic film cassette, a cassette shell 2 consists of an upper shell half 3 and a lower shell half 4 each molded from plastic having a light-tight property, and rotatably contains a spool 6 with photographic film 5, e.g., negative film, wound thereabout. The ends of the spool 6 do not project from the cassette shell 2, but are included in the outline of the cassette shell 2 underneath so as to prevent a user from rotating the spool 6 only with his fingers.

Figure 2:
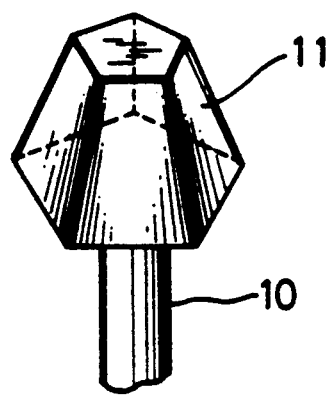
FIG. 2 is a perspective view of part of a rewinding shaft for rotating the spool of FIG. 1.
Figure 3:
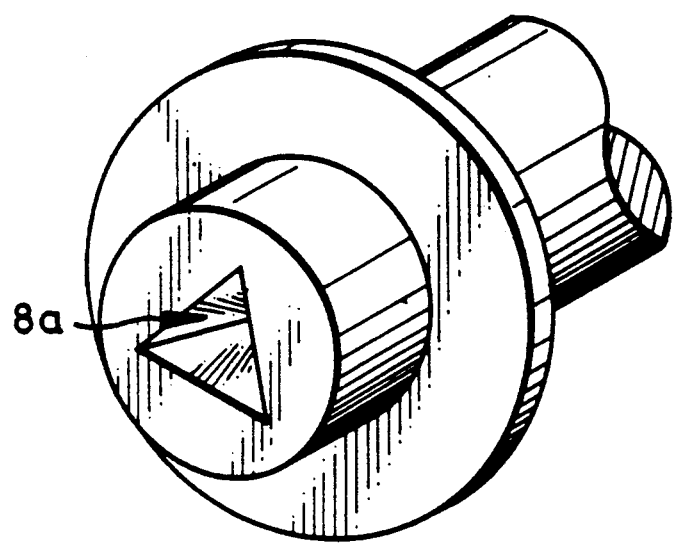
FIG. 3 is a perspective view of an important portion of the spool according to a variant of the first embodiment.
Figure 4:
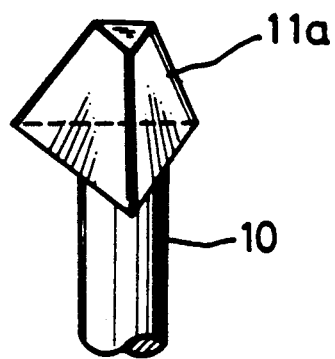
FIG. 4 is a perspective view of part of a rewinding shaft for rotating the spool of FIG. 3.

On the front end of the spool 6, a recess 8 is formed with five inclined planes 9 in the shape of a frustrum of a regular pentagonal pyramid having a decreasing space in a direction toward the inside of the recess 8. The recess 8 receives and is coupled to a coupling member 11 provided in a camera in the shape of a frustrum of a regular pentagonal pyramid, as shown in FIG. 2, which is formed on the tip of a rewinding shaft 10 of the camera. Alternatively, the recess 8a may be formed in the shape of a frustrum of a regular triangular pyramid, as shown in FIG. 3. In that case, the shape of a coupling member 11a needs to be that of a frustrum of a regular triangular pyramid, as shown in FIG. 4. A recess of the end of the spool 6 and a coupling member of the rewinding shaft 10 also may be formed in the shape of a frustrum of another regular polygonal pyramid, such as a regular quadrangular pyramid.

Figure 5:
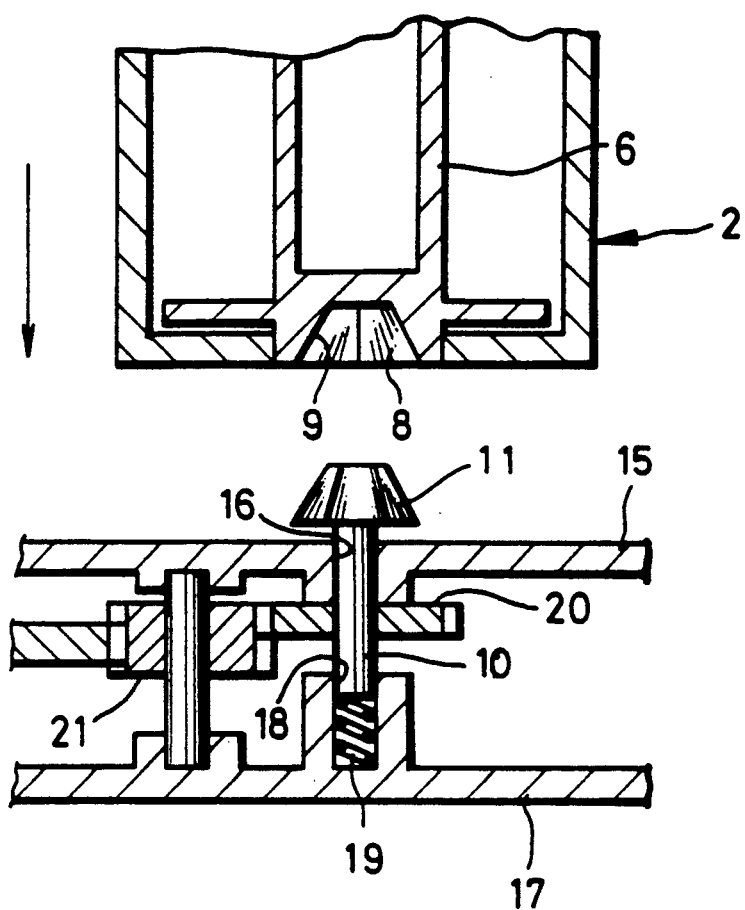
FIG. 5 is a sectional view of an important portion of the film cassette of FIG. 1 and a mechanism for driving the rewinding shaft of FIG. 2.

In FIG. 5, the rewinding shaft 10 is inserted slidably in a bearing hole 16 formed on an inner surface 15 of a film loading chamber of the camera. The lower end of the rewinding shaft 10 is fitted in a receiving hole 18 formed on a camera body 17. A spring 19 is inserted in the receiving hole 18, and biases the rewinding shaft 10 upwardly. A gear 20 is integrated with the rewinding shaft 10 in mesh with a driving gear 21 which is driven by a driving mechanism of the camera. The lower end of the rewinding shaft 10 never slips off the receiving hole 18, because a side of the gear 20 would abut the lower portion of the bearing hole 16 even when the gear 20 slides upwardly. The driving gear 21 is sufficiently thick to prevent the gear 20 from disengaging therewith even when the rewinding shaft 10 slides vertically. Thus, the driving force of the driving mechanism is transmitted reliably to the rewinding shaft 10. The driving force of the rewinding shaft 10 is transmitted to the spool 6 by the five inclined planes 9 in contact with the side faces of the coupling member 11. One fifth of the driving force of the rewinding shaft 10 is applied to each of the inclined planes 9.

Figure 6:
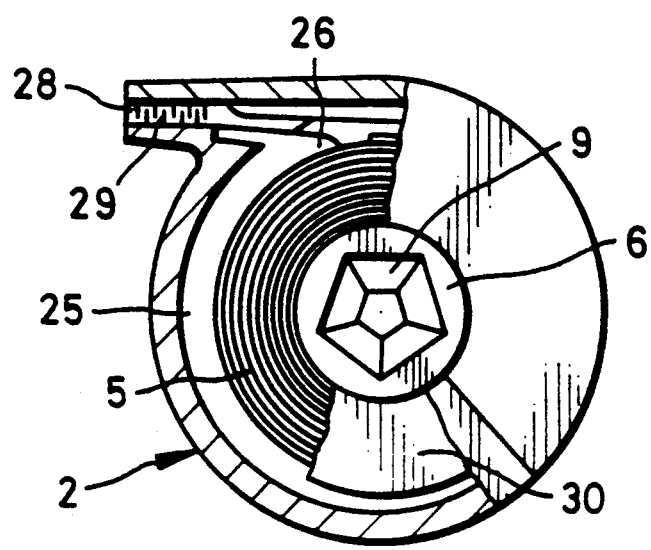
FIG. 6 is a front view, partially cutaway, of the film cassette of FIG. 1.

In FIG. 6, showing the inside of the cassette shell 2, a pair of annular ridges 25 are formed on the inner surface of the cassette shell 2. The ridges 25 press the outermost turn of the wound film 5 so as to prevent the film roll from loosening. When the spool 6 is rotated in the direction of unwinding of the film 5, the leading end of the film 5 is rotated so as to advance. The leading end of the film 5 is separated from the film roll by separation claws 26 formed on an end of the ridges 25, and is advanced to the outside of the cassette shell 2 through a film passage mouth 28. Plush 29 is attached to the film passage mouth 28 and shields the inside of the cassette shell 2 from external light through the film passage mouth 28. The spool 6 has a pair of flanges 30 and 31 for contact with both lateral edges of the film 5 therebetween and for shielding light in the longitudinal direction of the cassette shell 2.

Figure 7:
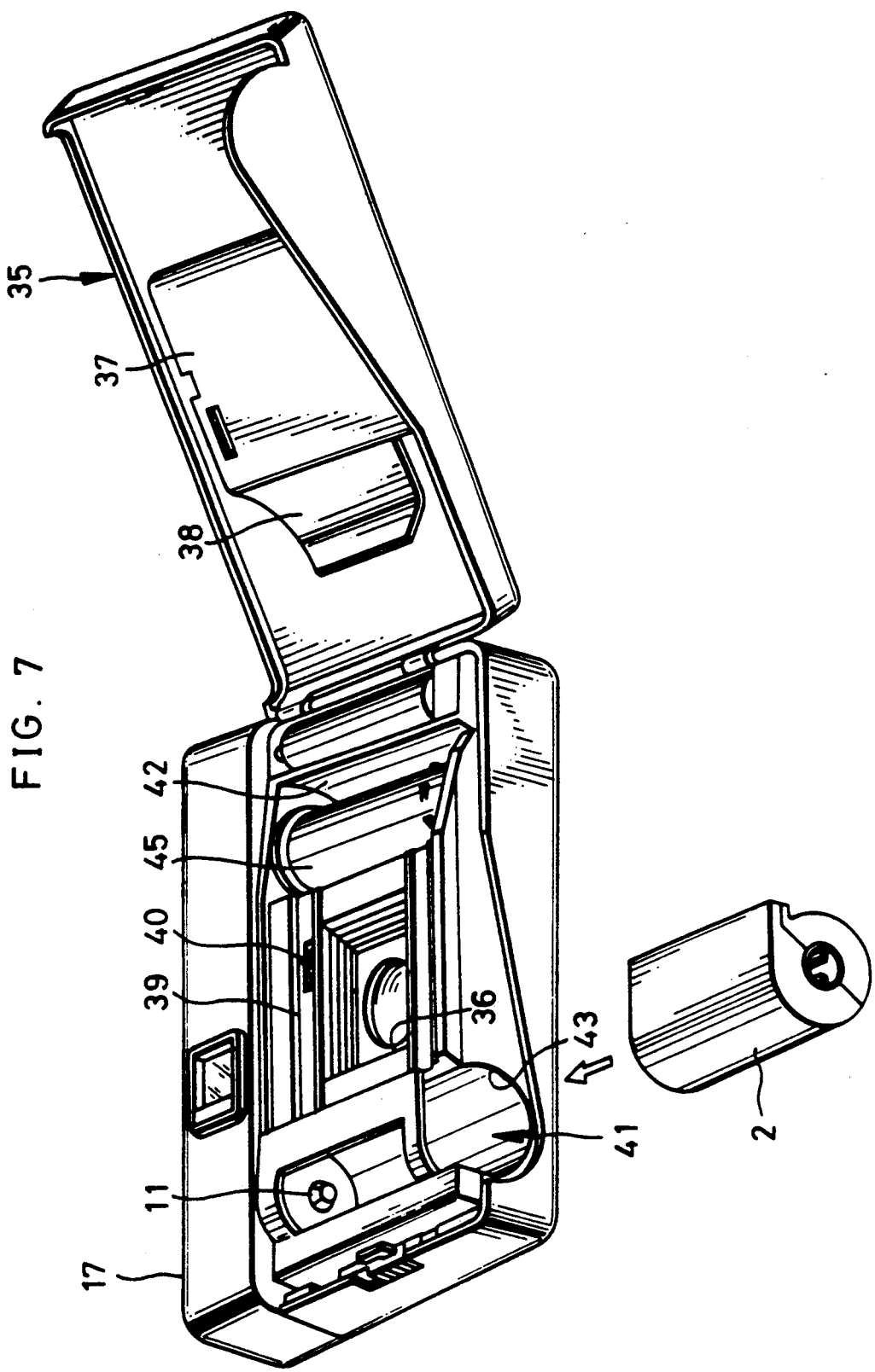
FIG. 7 is a perspective view of a camera for use with the film cassette of FIG. 1.

In FIG. 7, showing the camera to be used with the above-described film cassette, the camera body 17 with a back door 35 is provided with an exposure aperture 36. The back door 35 is provided with a pressure plate 37 and a film guide 38. When the back door 35 is closed, the pressure plate 37 presses the film 5 positioned on the exposure aperture 36 to keep the film 5 flat, and forms a film passageway 39 in the space defined by the exposure aperture 36. A free sprocket 40, rotated by the film 5 through its perforations, is provided on the upper side of the exposure aperture 36 in order to detect the feeding amount of the film 5.

A film loading chamber 41 and a film take-up chamber 42 are formed on respective left and right sides of the exposure aperture 36. The coupling member 11 described above is exposed in the inner position of the film loading chamber 41. The cassette shell 2 having the film 5 is inserted in the camera body 17 in the direction indicated by the arrow through an opening 43 formed on the bottom of the film loading chamber 41.

A take-up spool 45, provided at the center of the film take-up chamber 42, is driven by the abovedescribed driving mechanism of the camera in order to wind up the film 5 taken up by the guide of the film guide 38.

The operation of the film cassette according to the present invention now will be described. With the back door 35 open, the cassette shell 2 is inserted in the opening 43 in the direction of advancing the recess 8. The inclined planes 9 are guided by the lateral sides of the coupling member 11. Even when not fitted on the sides of the coupling member 11, the inclined planes 9 can be fitted reliably thereon by rotating the cassette shell 2 through at least 72° (360°/5). When the coupling member 11 is fitted in the recess 8, the attachment of the inclined planes 9 to the sides of the coupling member 11 keeps the spool 6 axially coincident with the rewinding shaft 10.

It is preferable, for the purpose of ensuring this operation, that the size of the film loading chamber 41 be slightly larger than that of the cassette shell 2 in the innermost position of the film loading chamber 41. It also is preferable to provide a mechanism for supporting the cassette shell 2 with a spring in the film loading chamber 41. As the cassette shell 2 can be rearranged manually, even if there is no axial coincidence, such a mechanism makes axial coincidence possible between the spool 6 and the rewinding shaft 11.

When the back door 35 is closed, the driving mechanism rotates the driving gear 21 and the take-up spool 45. The driving gear 21 rotates the spool 6 through a rewinding shaft 10 in the unwinding direction. The rotary axis of the spool 6 constitutes the center of the annular ridge 25 so as to prevent the outermost turn of the wound film 5 from being partially scratched by the annular ridge 25. The slipping friction between the film 5 and the annular ridge 25 is kept constant without an excessive increase in deviation.

Upon rotating the spool 6 in the unwinding direction, the leading end of the film 5 is advanced smoothly outside the cassette shell 2 through the film passage mouth 28, and is fed to the film take-up chamber 42 through the film passageway 39. When the leading end of the film 5 reaches the take-up spool 45, the take-up spool 45 winds up the film 5 from the cassette shell 2. Upon winding up a predetermined length of the film 5, the take-up spool 45 is stopped to position a first frame at the exposure aperture 36 on standby for taking a photograph. Thereafter, the film 5 is wound up on the take-up spool 45 each after exposure. When the film 5 no longer is fed from the cassette shell 2 upon completion of all exposures of the film 5, the driving mechanism of the camera rotates the driving gear 21 in the direction opposite to the direction of feeding the film 5. Thus, the spool 6 is rotated in the rewinding direction to rewind the film 5 from the film take-up chamber 42 into the cassette shell 2.

Figure 8:
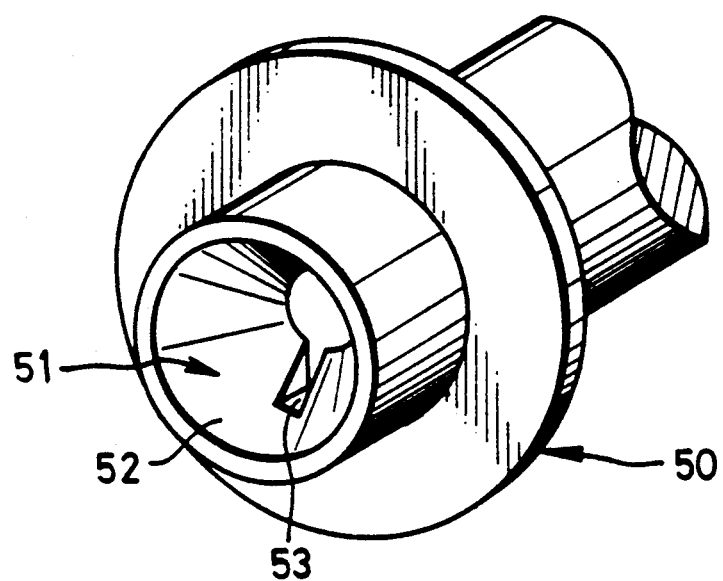
FIG. 8 is a perspective view of an important portion of a film cassette according to a second embodiment of the present invention.
Figure 9:
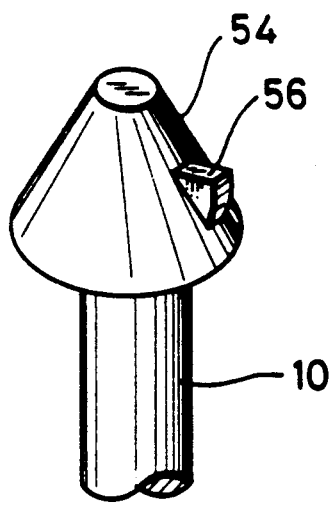
FIG. 9 is a perspective view of an important portion of a rewinding shaft for rotating the spool of FIG. 8.
Figure 10:
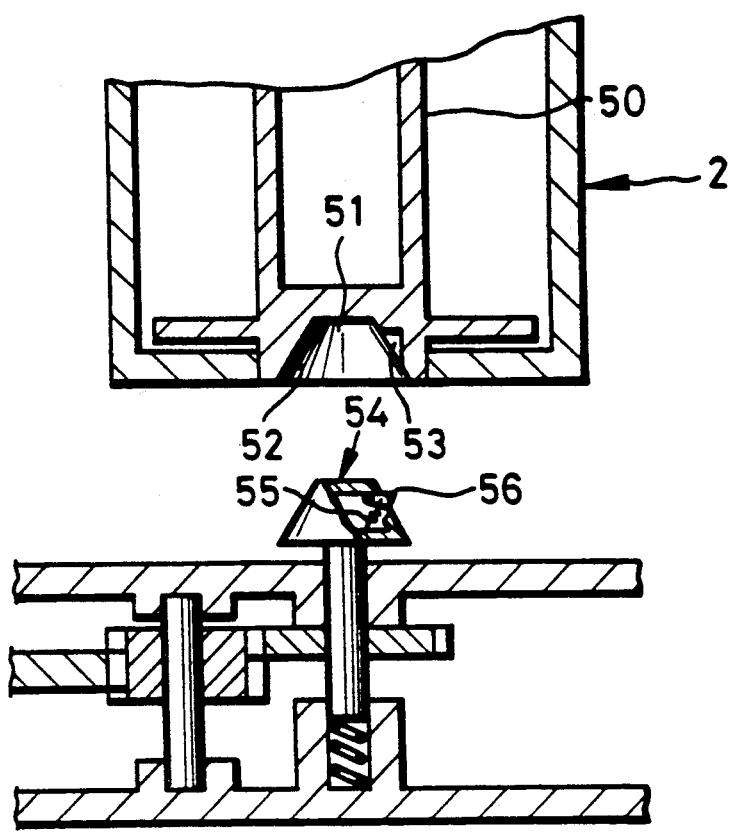
FIG. 10 is a sectional view of an important portion of a mechanism for driving the rewinding shaft of FIG. 9 and the film cassette of FIG. 8.

In FIG. 8, showing an important portion of the inventive film cassette according to a second preferred embodiment, the end of a spool 50 has a recess 51 in the shape of a frustrum of a cone, in which an arresting cutoff 53 is formed on a slope 51 defining the inner surface of the recess 51. As shown in FIG. 9, a coupling portion 54 is to be inserted in the recess 51. The coupling portion 54 is formed on the upper end of the rewinding shaft 10 in the shape of a frustrum of a cone corresponding to the recess 51. In FIG. 10, a metal arresting member 56, provided on the coupling member 54, is biased by a spring 55 so as to project retractably from the slope of the coupling member 54.

The arresting member 56 is fitted in the arresting cutoff 53 to transmit reliably the rotation of the rewinding shaft 10 to the spool 50 without slipping the coupling member 54 within the recess 51. With the coupling member 54 fitted on the spool 50, attachment of the slope 52 to the slope of the coupling member 54 makes the spool 50 axially coincident with the coupling member 54. Although engagement between the arresting member 56 and the arresting cutoff 53 transmits the rotary force of the rewinding shaft 10 to the spool 50 in the present embodiment, the rotary force also may be transmitted by engagement of a number of grooves formed on the slope 52 and the slope of the coupling member 54, similarly to a bevel gear and a correspondent receiving recess.

Figure 11:
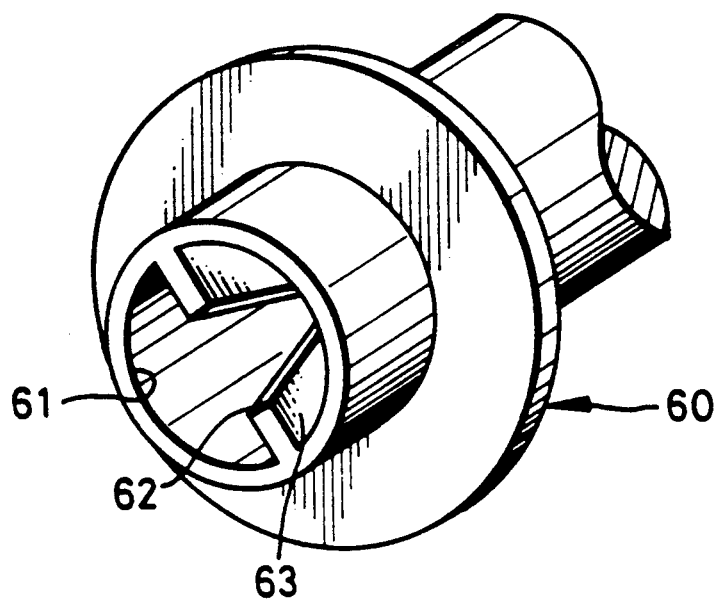
FIG. 11 is a perspective view of an important portion of a film cassette according to a third embodiment of the present invention.
Figure 12:
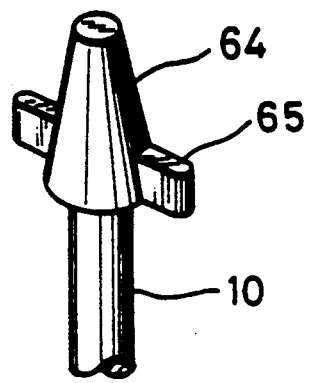
FIG. 12 is a perspective view of an important portion of a rewinding shaft for rotating the spool of FIG. 11.

In FIG. 11, showing an important portion of the inventive film cassette according to a third preferred embodiment, a cylindrical recess 61 is formed on an end of a spool 60. The inner surface of the recess 61 is provided with a pair of contact plates 63 having inclined planes 62 formed thereon. The spool 60 is rotated by the rewinding shaft 10 as shown in FIG. 12. The tip of the rewinding shaft 10 has a coupling member 64 in the shape of a frustrum of a cone to be guided by the inclined planes 62. A pair of projections 65 are formed on the side slope of the coupling member 64 for pressing the contact plates 63. It is noted that the projections also may be provided with the coupling portion 64 to retractably project therefrom by being biased by a spring contained therein.

Figure 13:
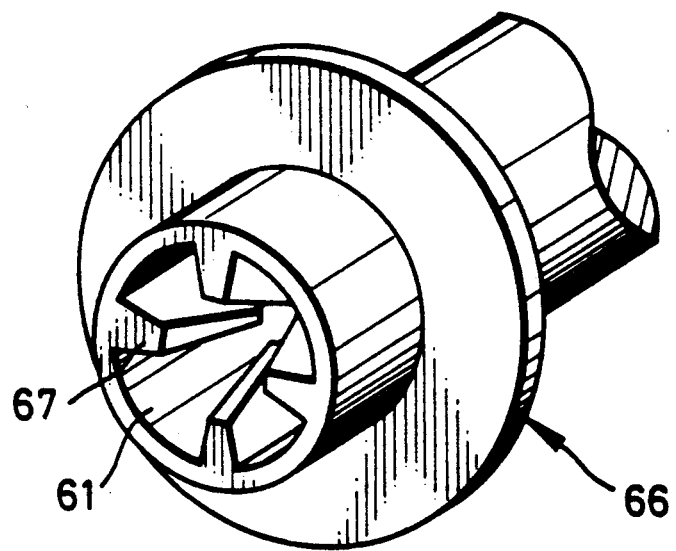
FIG. 13 is a perspective view of a film cassette according to a fourth embodiment of the present invention.

In FIG. 13, showing an important portion of the inventive film cassette according to a fourth preferred embodiment, a cylindrical recess 61 similar to that of the third embodiment is formed on the end of a spool 66. The inner surface of the recess 61 is provided with four contact plates 67 which are similar to the contact plates 63. The spool 66 can be rotated by the rewinding shaft 10 as shown in FIG. 12 having the coupling member 64. It is noted that the coupling member 64 also may have four projections like the projections 65 to transmit the rotary force of the rewinding shaft 10 in the four positions.

Figure 14:
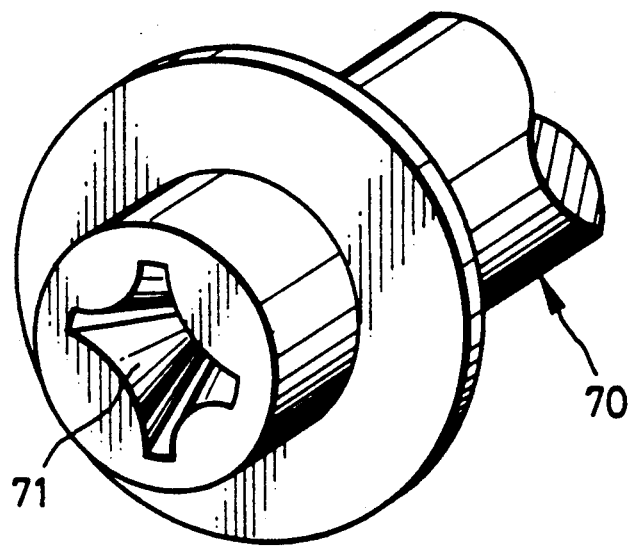
FIG. 14 is a perspective view of a film cassette according to a fifth embodiment of the present invention.
Figure 15:
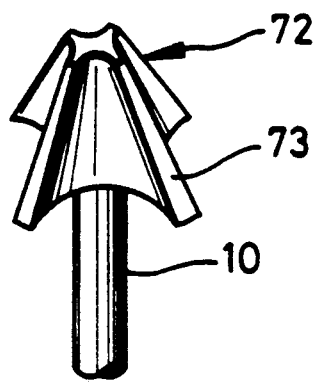
FIG. 15 is a perspective view of an important portion of the rewinding shaft for rotating the spool of FIG. 14.

In FIG. 14, showing an important portion of the inventive film cassette according to a fifth embodiment, a crossed recess 71 is formed on the end of a spool 70 in a shape which decreases in cross-section in the direction toward the inside of the crossed recess 71. The spool 70 is rotated by the rewinding shaft 10 as shown in FIG. 15. The tip of the rewinding shaft 10 has a coupling member 72 having the same shape as the tip of a cross-point screwdriver, and provided with four radial projections 73. When the rewinding shaft 10 is inserted in the crossed recess 71 of the spool 70 constructed in this manner, the crossed recess 71 guides the rewinding shaft 10 therein to be fitted thereon. The coupling member 72 is in mesh with the crossed recess 71 upon rotating the rewinding shaft 10. The radial projections 73 press equally the inside of the crossed recess 71 to rotate the spool 70.

Figure 16:
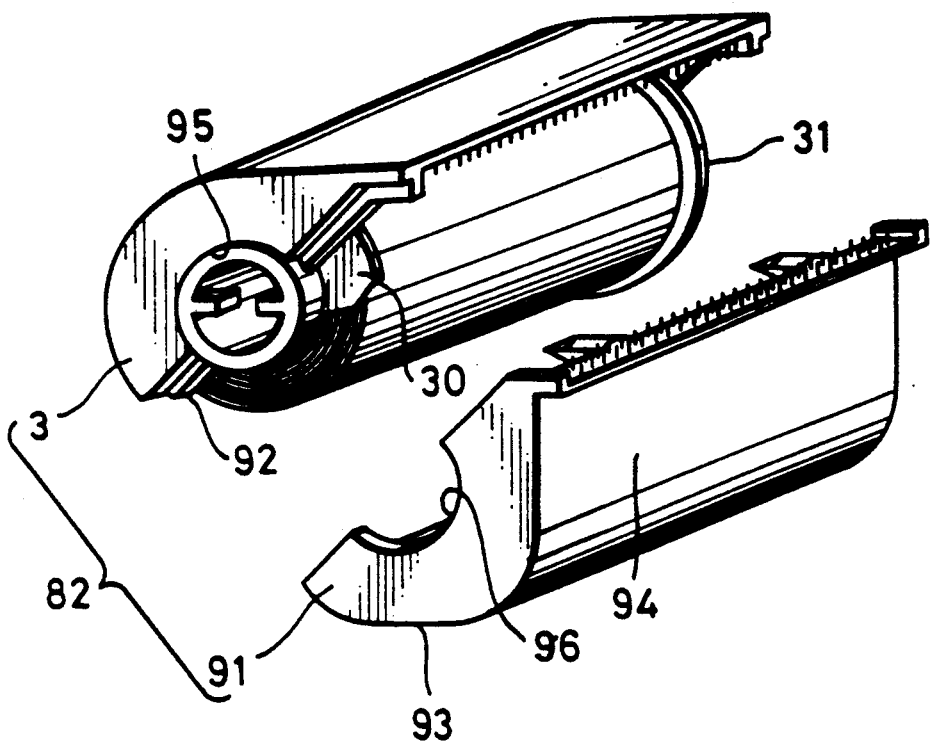
FIG. 16 is an exploded perspective view of a film cassette according to a sixth embodiment of the present invention.
Figure 17:
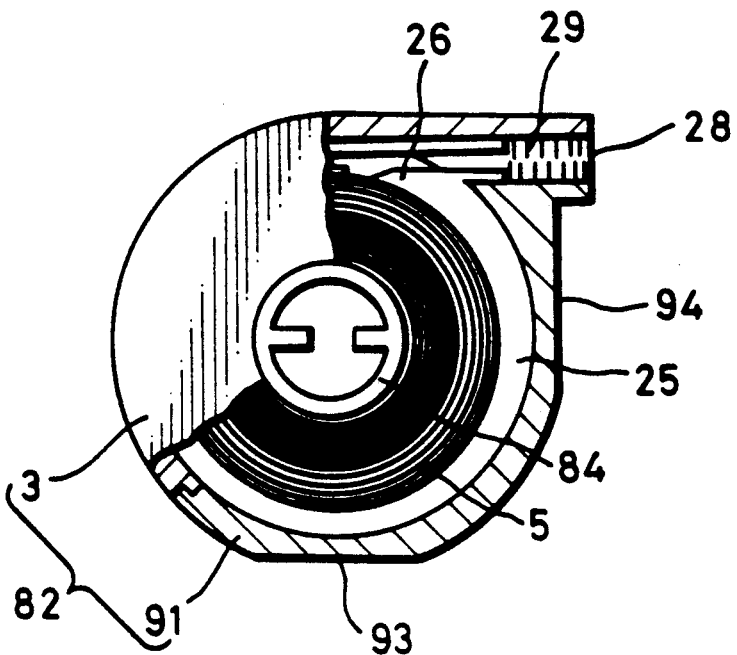
FIG. 17 is a rear view, partially cutaway, of the film cassette of FIG. 16.

FIGS. 16 and 17 show a sixth preferred embodiment of the inventive film cassette, which is convenient for positioning the film passage mouth properly in the camera. A cassette shell 82 consists of the upper shell half 3 and a lower shell half 91 both molded from light-tight plastic. A spool 84 with the film 5 wound thereabout is contained rotatably in the cassette shell 82. The cassette shell 82 also is provided with the two annular ridges 25 having the separation claws 26 on its inner surface.

A tongue 92 is formed integrally on the edge of the upper shell half 3 for joining the two shell halves except for the edge defining the film passage mouth 28, to attach the upper shell half 3 to the corresponding edge of the lower shell half 91, and serves to shield the juncture between the two halves from light as well as to join the upper and lower shell halves 3 and 91. The shell halves may be adhered by means of an adhesive agent, or welded by partially melting the shell halves with ultrasonic or dielectric heating, in order to intensify the junction and improve the light shielding condition. The circumferential surface of the lower shell half 91 is provided with two chamfered portions defining first and second positioning planes 93 and 94 to contact an inner surface of the film loading chamber of a camera as described below.

The first positioning plane 93 is formed on the bottom of the lower shell half 91. The second positioning plane 94 is formed on the side of the lower shell half 91 vertically to the first positioning planes 93. It is noted that, although the cassette shell 2 according to the present embodiment consists of the upper and lower shell halves 3 and 91, the shell 2 also may consist of a cylindrical shell component with only one end face open and a cap component to be fitted thereon. In that event, the cylindrical component then must have the film passage mouth and the two positioning planes formed on itself. Partial openings 95 and 96, formed on the shell halves 3 and 91, define a bearing aperture of a diameter substantially equal to that of the spool 84 to support the ends of the spool 84 rotatably with the shell halves 3 and 91 joined together. The ends of the spool 84 do not project from the cassette shell 82, as is the case of the spool 6 shown in FIG. 1.

Figure 18:
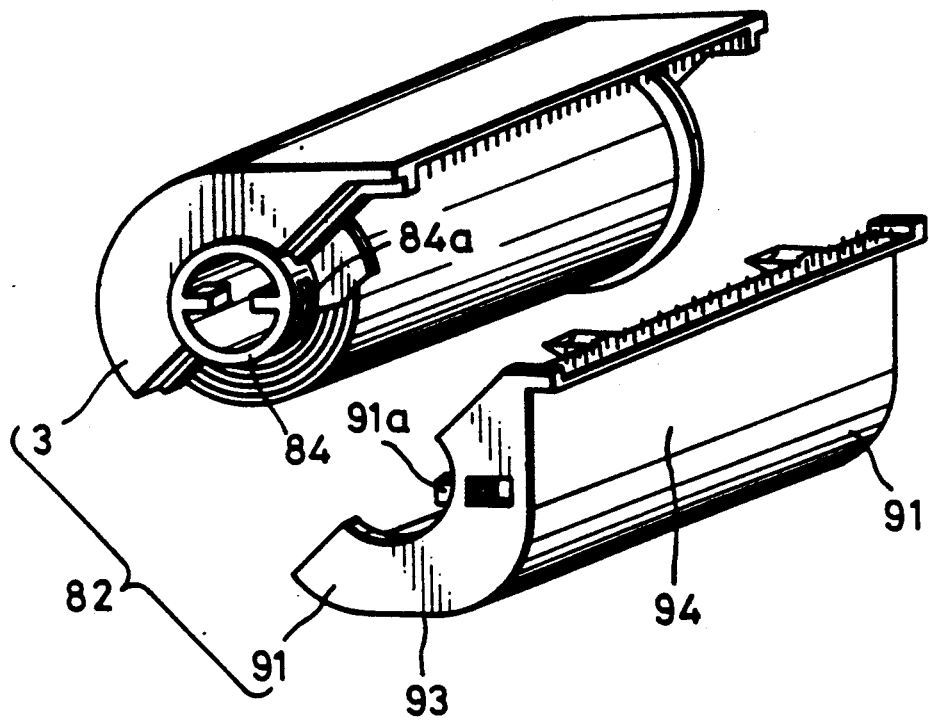
FIG. 18 is an exploded perspective view of a variant form of the sixth embodiment with a lock mechanism added thereto.

If a lock mechanism is provided for temporarily stopping the spool 84 as shown in FIG. 18, it is possible to prevent the spool 84 from rotating while carrying the film cassette and to prevent the film from loosening excessively. This lock mechanism consists of a recess 84a formed on the cicular surface of the spool 84 and a locking claw 91a provided slidable on the lower shell half 91. The locking claw 91a is fitted initially into the recess 84a at the time of shipment from the factory.

Figure 19:
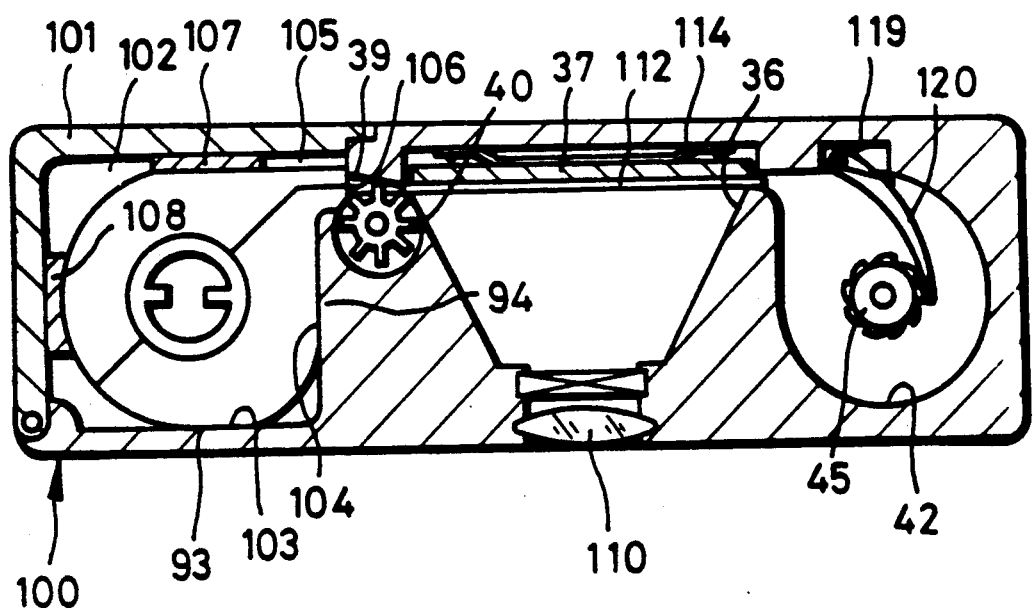
FIG. 19 is a sectional view of a camera loaded with the film cassette of FIG. 16.

A camera for use with the above-described film cassette now will be described with reference to FIG. 19. A chamber door 101 in the shape of a letter L is mounted swingably on a camera body 100 on the left side. With the chamber door 101 open, a film loading chamber 102 appears. The inner surface of the film loading chamber 102 includes first and second receiving planes 103 and 104 which contact the first and second positioning planes 93 and 94, respectively, for positioning the inserted cassette shell 82 in the film loading chamber 102. A passage mouth receiver 105 is formed inside the film loading chamber 102 in a rear position in the camera body for receiving the film passage mouth 28. At the inside of the passage mouth receiver 105, a film inserting mouth 106 is formed for passing therethrough the film 5 which is advanced from inside the cassette shell 82. Resilient members, e.g. sponges 107 and 108, are mounted on the inside of the chamber door 101. When the chamber door 101 is closed, the sponges 107 and 108 press the cassette shell 82 on the first and second receiving planes 103 and 104. If a window is formed in the chamber door 101 for allowing the reading of data, indicated on the cassette shell, as to the film, from outside the camera body, then a sponge also may cover the circumference of the window in light-tight fashion.

A taking lens 110 is mounted on the camera body 100 at the center on the front side. The exposure aperture 36 has a pair of rails 112 for guiding the film 5 along the direction of feeding of the film 5. The guide rails 112 define the film passageway 39 connected to the film inserting mouth 106. The pressure plate 37 is biased by a spring 114 from behind to be in contact with the guide rails 112. The sprocket 40 is a free sprocket for detecting the amount of feeding of film 5, but instead may be a driving sprocket for feeding the film 5 to the film take-up chamber 52 by means of the perforations in the leader of the film 5. The rear side of the film take-up chamber 42 supports a swingable guide member 120 biased by a spring 119 in the clockwise direction to guide the leader of the film 5 to the film take-up spool 45 from the film passageway 39.

The operation of the above-described film cassette now will be described. With the chamber door 101 open, the cassette shell 82 is inserted in the film loading chamber 102 while directing the film passage mouth 28 to the center of the camera body 100. The first positioning plane 93 is kept in contact with the first receiving plane 103. While the chamber door 101 is swung in the closing direction, the cassette shell 82 is pressed by the sponge 108 and is slid to the right in the film loading chamber 102. The second positioning plane 94 comes into contact with the second receiving plane 104. When the chamber door 101 is completely closed, the cassette shell 82 is pressed toward the front of the camera body 100 by the sponge 107 to press the first positioning plane 93 on the first receiving plane 103. Thus the cassette shell 82 is positioned in the film loading chamber 102 such that the film passage mouth 28 is positioned properly on the film inserting mouth 106.

The leader of the film 5 is advanced after the chamber door 101 is closed, reaches the take-up spool 45, and is wound up thereon. The feeding amount of the film 5 fed from the cassette shell 82 is detected by the free sprocket 40 rotated in engagement with the perforations of the film 5. If a driving sprocket is used instead of the free sprocket 40, the sprocket is released for rotation by a mechanism such as a clutch in order to make it possible to detect the perforations.

Figure 20:
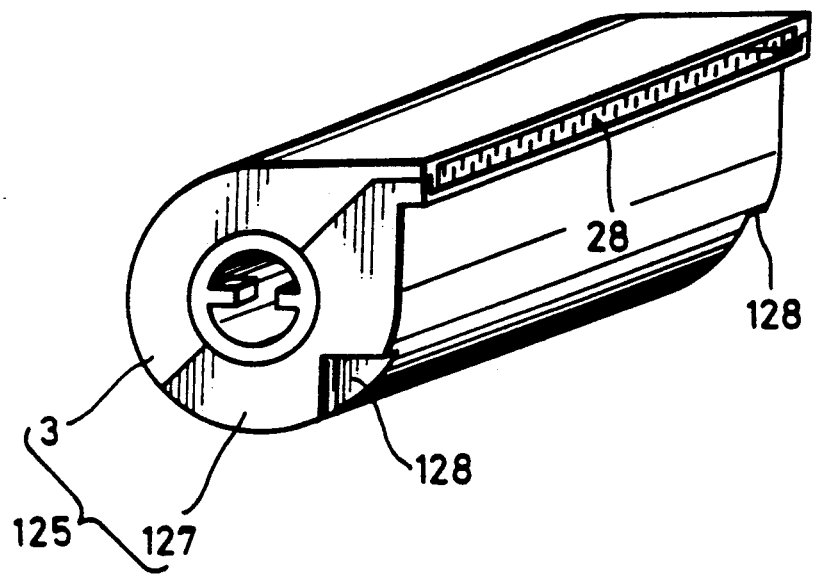
FIG. 20 is a perspective view of a film cassette according to a seventh embodiment of the present invention.

In FIG. 20, showing the inventive film cassette according to a seventh preferred embodiment, a cassette shell 125 consists of the upper shell half 3 and a lower shell half 127 formed to have a portion of the film passage mouth 28. Positioning recesses 128 are formed on both end faces of the lower shell half 127 in the shape forming right angle.

Figure 21:
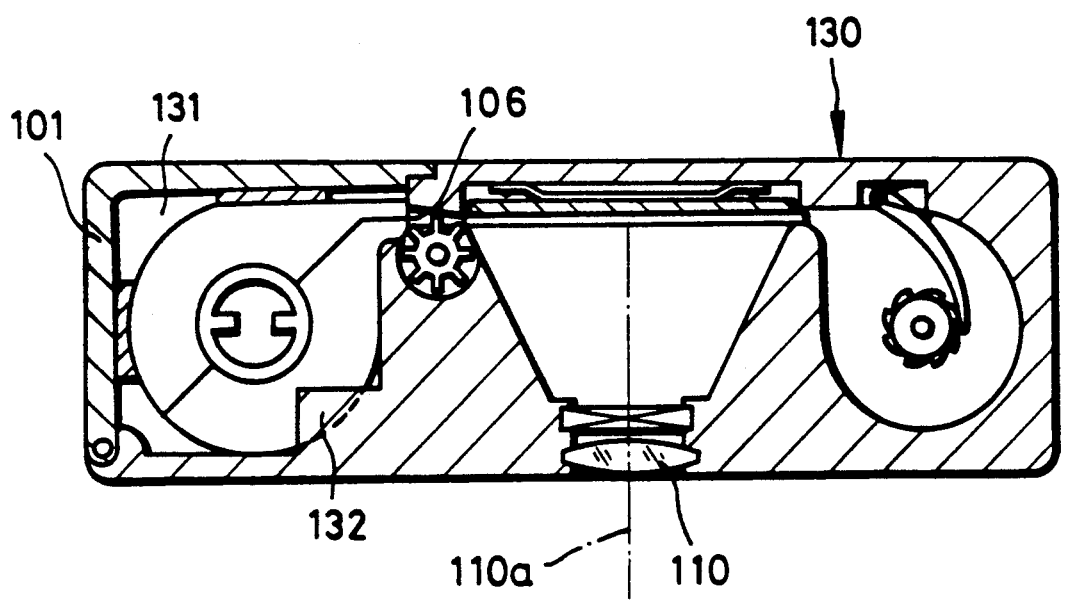
FIG. 21 is a sectional view of a camera loaded with the film cassette of FIG. 20.

FIG. 21 shows a camera loaded with the film cassette shown in FIG. 20. A camera body 130 has the chamber door 101 in a swingable state. With the chamber door 101 open, the film loading chamber 131 appears. The inner wall of the film loading chamber 131 is provided with receiving projections 132, each forming a right angle, of which one side is parallel to an optical axis of the taking lens 110 and the other side is perpendicular thereto. The receiving projections 132 are fitted in the positioning recesses 128 of the cassette shell 125 inserted in the film loading chamber 131 so as to position the film passage mouth 28 precisely at the film inserting mouth 106.

Figure 22:
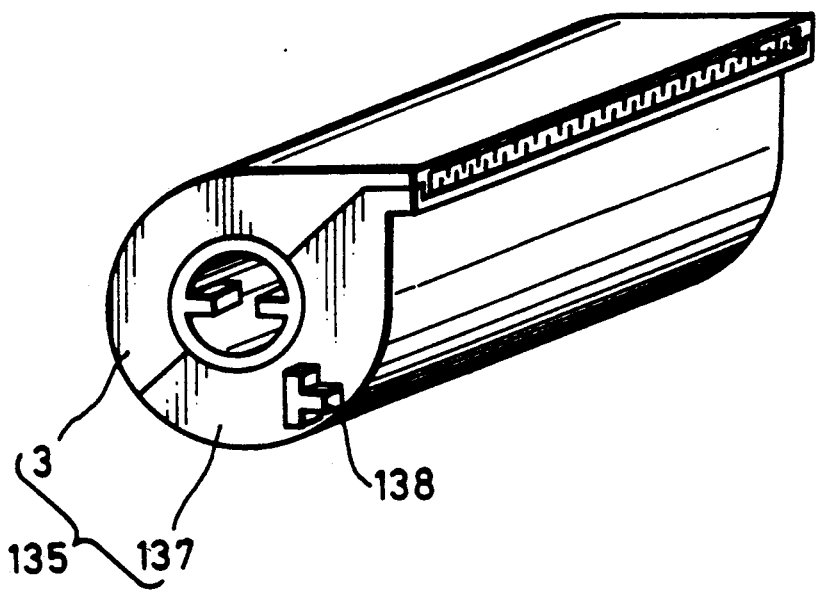
FIG. 22 is a perspective view of a film cassette according to an eighth embodiment of the present invention.

In FIG. 22, showing the inventive film cassette according to an eighth preferred embodiment of the present invention, a cassette shell 135 consists of the upper shell half 3 and a lower shell half 137. Instead of the positioning recesses 128 of FIG. 20, positioning projections 138 are formed in the shape of a letter T on both end faces of the lower shell half 137 in order to position the cassette shell 125.

Figure 23:
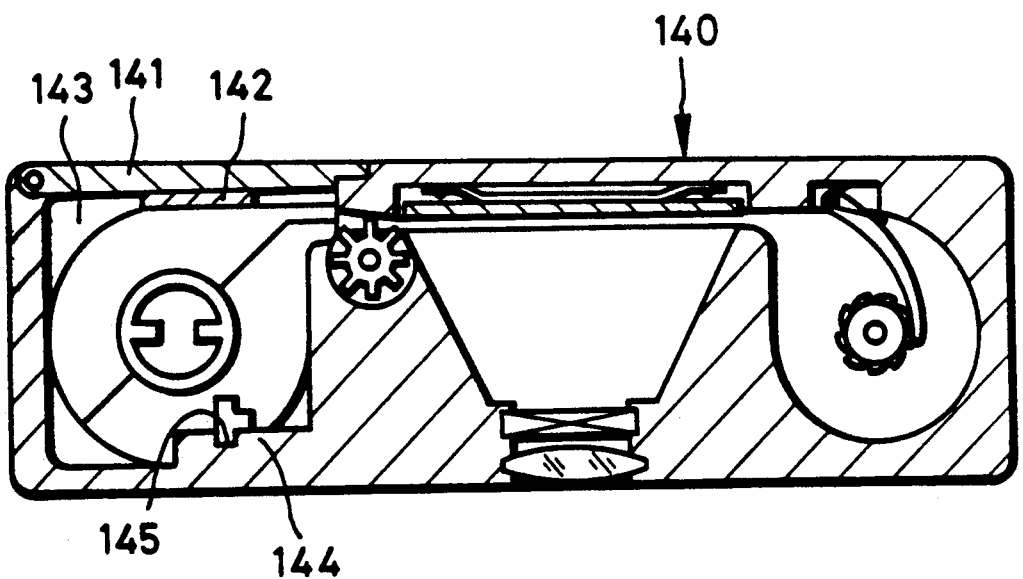
FIGS. 23 and 24 are sectional views of cameras loaded with the film cassette of FIG. 22.

In FIG. 23, showing the camera loaded with the above film cassette from behind, a camera body 140 is provided with a chamber door 141 on the back side. The chamber door 141 has a sponge 142 on its inner side. A film loading chamber 143 is formed inside the chamber door 141. The size of the film loading chamber 143 in the direction of feeding the film 5 is determined to be substantially the same as the diameter of the cassette shell 135. A pair of supporting members 144 are formed on the inner wall of the film loading chamber 143 for contact with the end faces of the inserted cassette shell 135. Recesses 145 are formed respectively on the supporting members 144 for receiving the lower ends of the positioning projections 138.

When the cassette shell 135 is loaded in the film loading chamber 143, the cassette shell 135 is inserted from behind the camera body 140 with the chamber door 141 open. As the film passage mouth 2 is held to keep the direction vertical to the direction of insertion of the cassette shell 135, the inner wall of the film loading chamber 143 restricts the insertion direction so as to fit the positioning projections 138 in the recesses 145. When the chamber door 141 is closed, the cassette shell 135 is pressed by the sponge 142 and positioned in the film loading chamber 143 so as to position the film passage mouth 28 precisely on the film inserting mouth 106.

Figure 24:
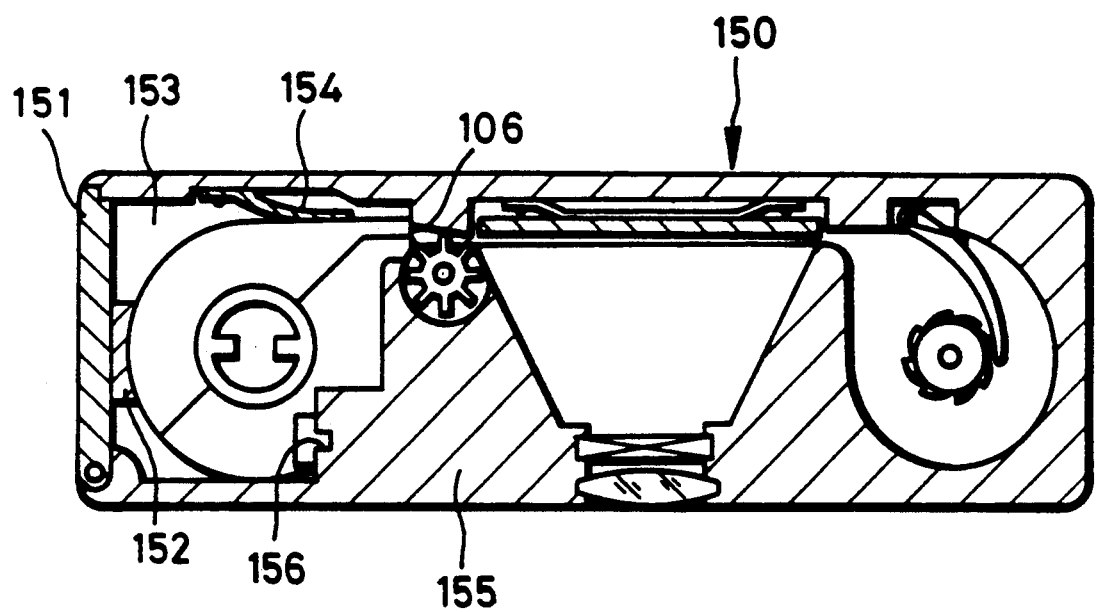

In FIG. 24, showing the camera for loading the film cassette in FIG. 22 therein from its lateral side, a camera body 150 is provided with a chamber door 151 on the lateral side. The chamber door 151 has a sponge 152 on its inner side. A film loading chamber 153 is formed to the right inside the chamber door 151. A spring 154 is provided inside the rear wall of the film loading chamber 153 for pressing the inserted cassette shell 135 toward the front of the camera body 150. A pair of supporting members 155 are formed on the inner wall of the film loading chamber 153 for contact with the end faces of the inserted cassette shell 135. Recesses 156 are formed respectively on the supporting members 155 for receiving the right ends of the positioning projections 138.

When the cassette shell 135 is loaded in the film loading chamber 153, the cassette shell 135 is inserted from the lateral side of the camera body 150 with the chamber door 151 open. As the film passage mouth 28 is held to keep the direction along the direction of insertion of the cassette shell 135, the spring 154 restricts the insertion direction so as to fit the positioning projections 138 in the recesses 156. When the chamber door 151 is closed, the cassette shell 135 is pressed by the sponge 152, and is positioned in the film loading chamber 153 so as to position the film passage mouth 28 precisely on the film inserting mouth 106.

Although a lower portion of the film passage mouth 28 in the above embodiments is formed on the lower shell half with a positioning portion formed thereon, instead the whole film passage mouth 28 may be formed on the lower shell half. The cassette shell may be positioned both by a single positioning portion such as a projection or a recess, and by the positioning portion in cooperation with a plane portion formed on the cassette shell as shown in the sixth embodiment.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A photographic film cassette for containing photographic film wound around a spool in a cassette shell in light-tight fashion, wherein rotation of said spool causes a film leader to advance through a film passage mouth, said film cassette comprising:
    a first molded shell component which is part of said cassette shell, with which at least a part of said film passage mouth is integrated;
    a second shell component joined to said first shell component to form said cassette shell; and
    three positioning plane surfaces, integrated with said first shell component, and disposed perpendicularly to each other, for positioning said cassette shell in contact with receiving means formed in a film loading chamber in a camera, wherein said positioning plane surfaces are regulated by said receiving means in directions parallel to an axis of said spool and perpendicular to the axis of said spool.

2. A photographic film cassette as defined in claim 1, wherein said first and second shell components comprise first and second shell halves joined together along a juncture along a plane parallel to said spool, said first and second shell halves respectively having lower and upper portions of said film passage mouth formed thereon.

3. A photographic film cassette as defined in claim 2, wherein said first and second shell halves are formed of plastic having a light-tight property.

4. A photographic film cassette as defined in claim 2, wherein said positioning plane surfaces have at least one positioning plane formed on a lateral surface of said first shell half so as to be parallel with respect to the axis of said spool, and another positioning plane formed on a lateral surface of said first shell half so as to be parallel to the axis of said spool.

5. A photographic film cassette for containing photographic film wound around a spool in a cassette shell in light-tight fashion, wherein rotation of said spool causes a film leader to advance through a film passage mouth, said film cassette comprising:
    a first molded shell component which is part of said cassette shell, with which at least a part of said film passage mouth is integrated;
    a second shell component joined to said first shell component to form said cassette shell; and
    a pair of positioning means, integrated with said first shell component, for positioning said cassette shell in contact with receiving means formed in a film loading chamber in a camera, wherein each positioning means consists of three planes disposed at right angles with respect to each other and, at the same time, two of said three planes are parallel to said spool and the other plane is perpendicular to said spool.

6. A photographic film cassette as defined in claim 5, wherein said first and second shell components comprise first and second shell halves joined together along a juncture along a plane parallel to said spool, said first and second shell halves respectively having lower and upper portions of said film passage mouth formed thereon.

7. A photographic film cassette as defined in claim 6, wherein said first and second shell halves are formed of plastic having a light-tight property.

* * * * *